(12) United States Patent
Marshall

(10) Patent No.: US 12,283,396 B2
(45) Date of Patent: Apr. 22, 2025

(54) LOW PROFILE WATERTIGHT CONNECTOR AND METHOD OF USING THE SAME

(71) Applicant: DOMINION ENERGY, INC., Richmond, VA (US)

(72) Inventor: Mark E. Marshall, Glen Allen, VA (US)

(73) Assignee: DOMINION ENERGY, INC.

( * ) Notice: Subject to any disclaimer, the term of this patent is extended or adjusted under 35 U.S.C. 154(b) by 0 days.

(21) Appl. No.: 17/521,839

(22) Filed: Nov. 8, 2021

(65) Prior Publication Data

US 2022/0148765 A1 May 12, 2022

Related U.S. Application Data

(60) Provisional application No. 63/111,422, filed on Nov. 9, 2020.

(51) Int. Cl.
*H01B 17/58* (2006.01)
*H01B 17/26* (2006.01)
*H01B 17/30* (2006.01)
*H02G 1/08* (2006.01)
*H02G 3/08* (2006.01)

(52) U.S. Cl.
CPC ......... *H01B 17/583* (2013.01); *H01B 17/265* (2013.01); *H01B 17/301* (2013.01); *H02G 1/08* (2013.01); *H02G 3/083* (2013.01)

(58) Field of Classification Search
CPC ... H01B 17/583; H01B 17/265; H01B 17/301
See application file for complete search history.

(56) References Cited

U.S. PATENT DOCUMENTS 5,059,747 A * 10/1991 Bawa .................... H02G 3/0675
174/541
5,069,586 A * 12/1991 Casey ...................... F16B 5/01
411/908

FOREIGN PATENT DOCUMENTS

GB 2323977 A * 10/1998 ........... H02G 3/0675

OTHER PUBLICATIONS

M&W WTC-34 2" Zinc Watertight Connect, available at https://www.gordonelectricsupply.com/p/M-W-Wtc-34-2In-Zinc-Watertight-Connect-B-O-890-X-1-540/6446680, last accessed Mar. 10, 2022, 3 pages.

* cited by examiner

*Primary Examiner* — Jason L Vaughan
*Assistant Examiner* — Amanda Kreiling
(74) *Attorney, Agent, or Firm* — Bernard G. Pike; Pike IP law

(57) ABSTRACT

A connector adapted to secure an electrical power line entering an electrical meter box comprises (a) a cylindrical member adapted to be at least partially inserted into the meter box through an access hole, (b) a flange affixed to or integral with a first end of the cylindrical member and (c) a cylindrical grommet selectively insertable at least partially into a second end of the cylindrical member and securable therein. The flange remains outside of the meter box and abuts an outer surface of the wall of the meter box or abuts a gasket sandwiched between the flange and the outer surface of the wall of the meter box. The cylindrical member, the flange, and the grommet all have aligned throughholes through which the power line passes as the power line enters the meter box.

17 Claims, 12 Drawing Sheets

Section A-A

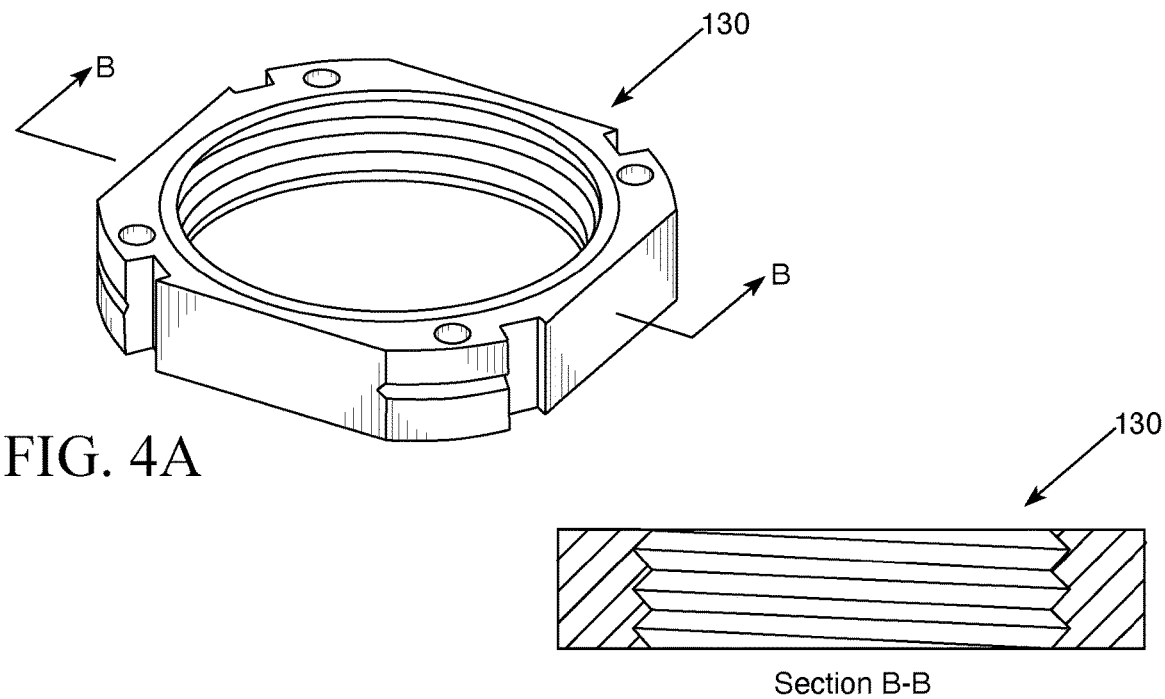
FIG. 4A
FIG. 4B
Section B-B
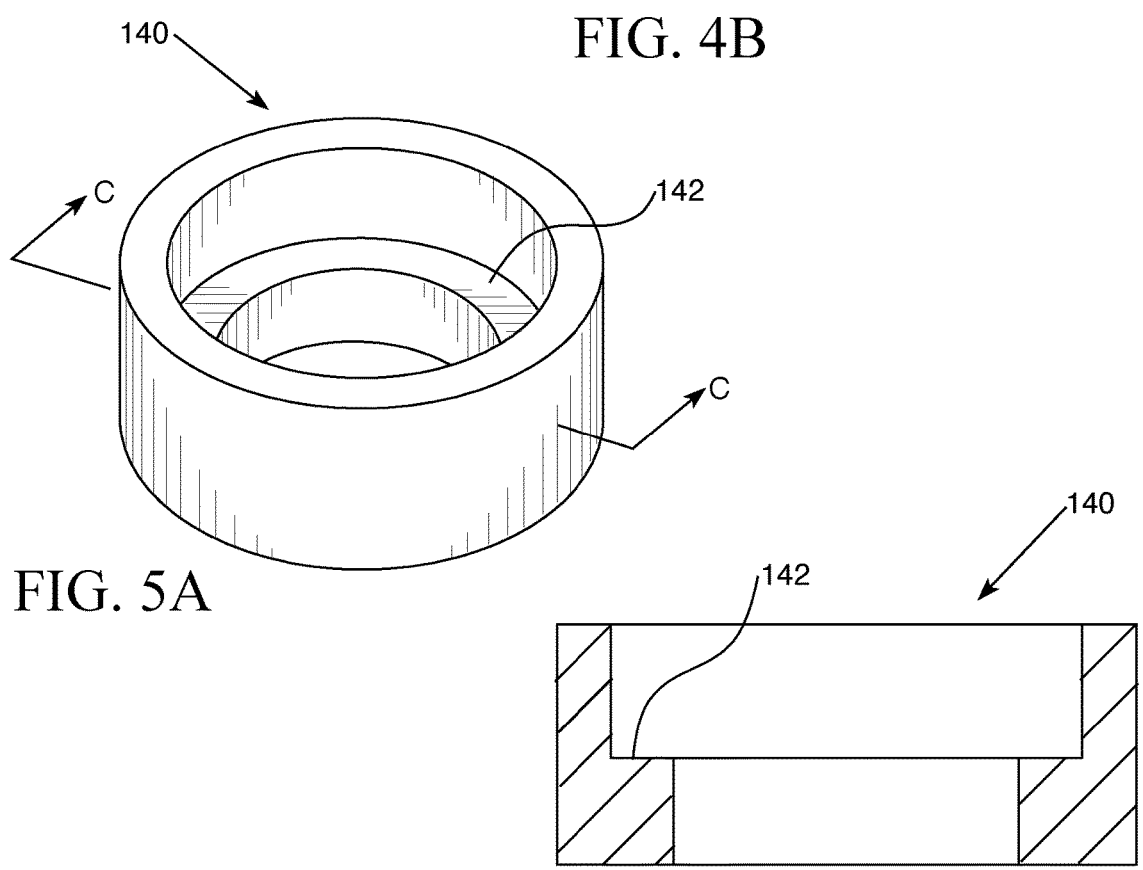
FIG. 5A
FIG. 5B

Section D-D

Section G-G

LOW PROFILE WATERTIGHT CONNECTOR AND METHOD OF USING THE SAME

CROSS-REFERENCE TO RELATED APPLICATIONS

This application claims priority to U.S. Provisional Application Ser. No. 63/111,422, filed Nov. 9, 2020, the contents of which are incorporated herein by reference in its entirety.

FIELD OF THE INVENTION

This invention relates to watertight connectors for electrical lines.

BACKGROUND

FIGS. 1A and 1B illustrate a conventional electric meter box 10 which is used to house an electric meter and to bring an electric power line into a building (e.g., a house). The meter box 10 is mounted on the building. The front wall 12 has a large opening 14 to accept an electric meter (not illustrated). The top end 16 has an opening 18 to receive a riser pipe (not illustrated) through which an electric power line is run from the street into the meter box 10 to connect to the meter. One or more knockouts in the side walls and/or back wall enable an electrical power line to be run from the meter box 10 into the building (this is termed the load side). In the illustrated meter box, there is a knockout 40 on one side wall and a large knockout 22 and a small knockout 23 on the back wall 104 (the different sized knockouts enable different sized wires to enter the meter box). A plurality of protrusions 106 on the back wall provide a narrow space between the meter box 10 and the building to which the meter box is mounted.

The electric power company is responsible for connecting the power line from the street to the meter box and the meter, while the customer (using a licensed electrician) is responsible for running the power line from the meter box into the building and connecting the power line to an electrical panel. Customer must sometimes replace the load side wire coming from the electrical panel to the meter box due to deterioration of the cable or the need to run a larger cable. The conventional connectors for securing the load side wire coming into the meter box is quite large and protrudes a significant amount from the rear of the meter box. Because of how far the conventional connector protrudes from the meter box, it is often necessary (especially when re-wiring the meter box) to enlarge the hole through which the load side wire enters the building, thereby causing undesirable damage to the siding of the building.

Ensuring that the meter box is watertight and that no water enters the meter box through the knockout used to run the power line into the building is challenging. What is needed is a mechanism for helping to prevent water from entering the meter box through the knockout used to run the power line into the building, and which readily enables wiring/re-wiring of the meter box without damaging the siding.

BRIEF SUMMARY OF THE DISCLOSURE

In one embodiment of the invention, a connector adapted to secure an electrical power line entering an electrical meter box comprises (a) a cylindrical member adapted to be at least partially inserted into the meter box through an access hole defined in a wall of the meter box, (b) a flange affixed to or integral with a first end of the cylindrical member and (c) a cylindrical grommet selectively insertable at least partially into a second end of the cylindrical member and securable therein. The flange remains outside of the meter box when the cylindrical member is at least partially inserted into the meter box and abuts an outer surface of the wall of the meter box or abuts a gasket sandwiched between the flange and the outer surface of the wall of the meter box. The cylindrical member, the flange, and the grommet all have aligned through-holes through which the power line passes as the power line enters the meter box.

The cylindrical member may comprise a support ledge on an internal surface of the cylindrical member. The ledge may comprise a circumferential ledge. A portion of the grommet may contact the ledge when the grommet is inserted at least partially into a second end of the cylindrical member. The grommet may comprise a first cylindrical portion having a diameter and a second cylindrical portion having a diameter greater than the diameter of the first cylindrical portion, thereby forming a shoulder where the first cylindrical portion and the second cylindrical portion meet, such that the shoulder contacts the ledge when the grommet is inserted at least partially into a second end of the cylindrical member.

The connector may further comprise a securing means to secure the grommet at least partially in the cylindrical member. The securing means may also compress the grommet against the ledge. The securing means may comprise a cupped washer selectively positionable against an end of the grommet furthest from the flange and a nut selectively attachable to the second end of the cylindrical member to retain the cupped washer against the grommet. The cupped washer may define a center hole that aligns with the grommet through-hole when the cupped washer is positioned against the grommet.

The connector may further comprise a cylindrical grommet adapter having a first inner diameter and a second inner diameter greater than the first inner diameter, thereby forming a ledge. The grommet adapter may be selectively insertable at least partially into the cylindrical member. A portion of the grommet may contact the ledge of the grommet adapter when the grommet is selectively inserted at least partially into the cylindrical member.

The cylindrical member may comprise a first cylindrical sub-member affixed to or integral with the flange and a second cylindrical sub-member selectively attachable to the first cylindrical sub-member. The second cylindrical sub-member may be selectively attachable to the first cylindrical sub-member via male threads on the first cylindrical sub-member and cooperating female threads on the second cylindrical sub-member. The second cylindrical sub-member may be adapted to draw the flange or the gasket against the outer surface of the wall of the meter box as the second cylindrical sub-member is selectively attached to the first cylindrical sub-member, thereby securing the connector to the wall of the meter box.

The cylindrical member may comprise male threads. The connector may further comprise a connector nut that is selectively attachable to the cylindrical member via cooperating female threads. The connector nut may be adapted to draw the flange or the gasket against the outer surface of the wall of the meter box as the connector nut is selectively attached to the cylindrical member, thereby securing the connector to the wall of the meter box.

Alternative embodiments of the invention may comprise a method of securing an electrical power line entering an electrical meter box, using the connector described above.

BRIEF DESCRIPTION OF THE SEVERAL VIEWS OF THE DRAWINGS

Reference will now be made to the accompanying drawings, which are not necessarily drawn to scale. The following detailed description of the disclosure will be better understood when read in conjunction with the appended drawings. It should be understood, however, that the disclosure is not limited to the precise arrangements and instrumentalities shown. In the drawings:

FIGS. 4A and 4B are, respectively, a perspective view and a sectional view of a connector nut of a low profile watertight connector, in accordance with embodiments of the present invention.

FIGS. 5A and 5B are, respectively, a perspective view and a sectional view of a grommet adapter of a low profile watertight connector, in accordance with embodiments of the present invention.

DETAILED DESCRIPTION OF THE DISCLOSURE

Figure 1A:
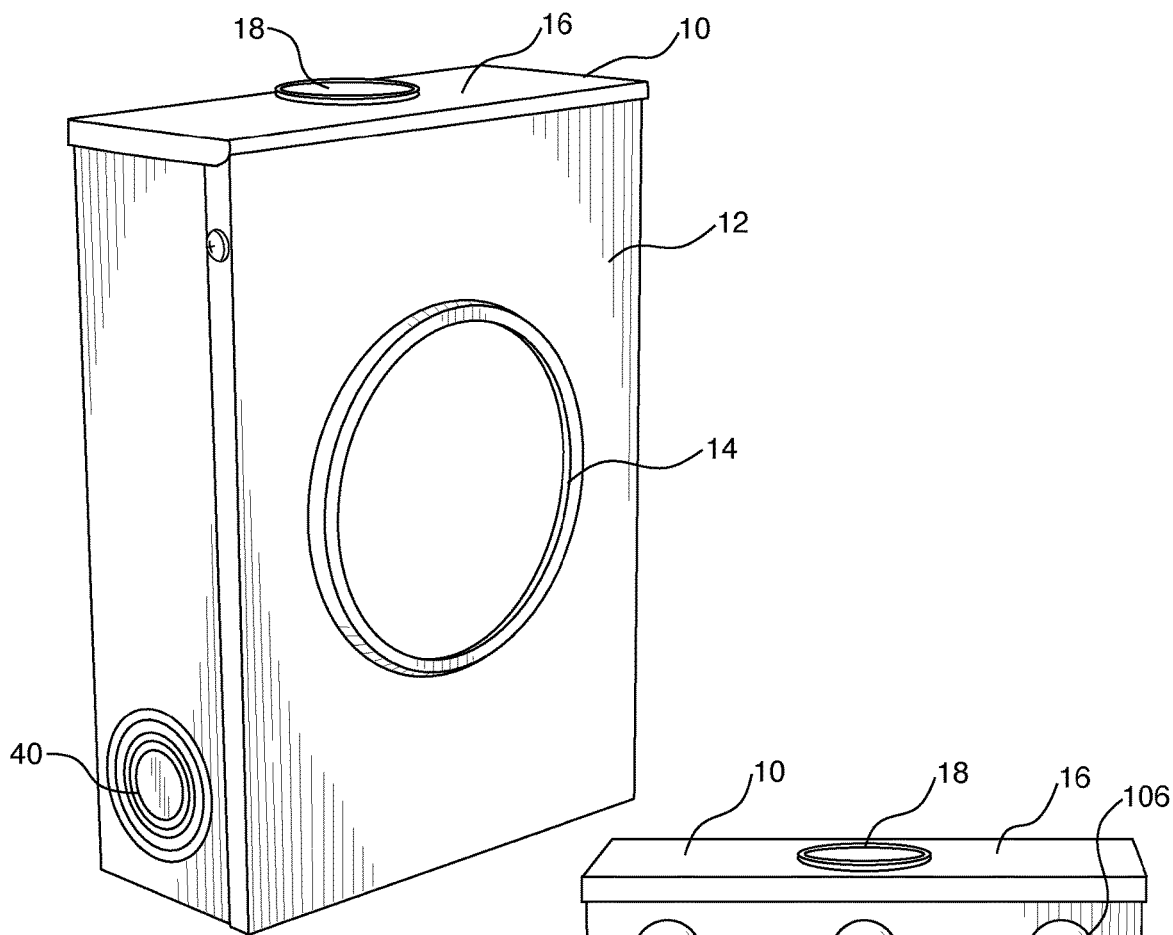
FIGS. 1A and 1B are front and rear views of a conventional electric meter box.
Figure 1B:
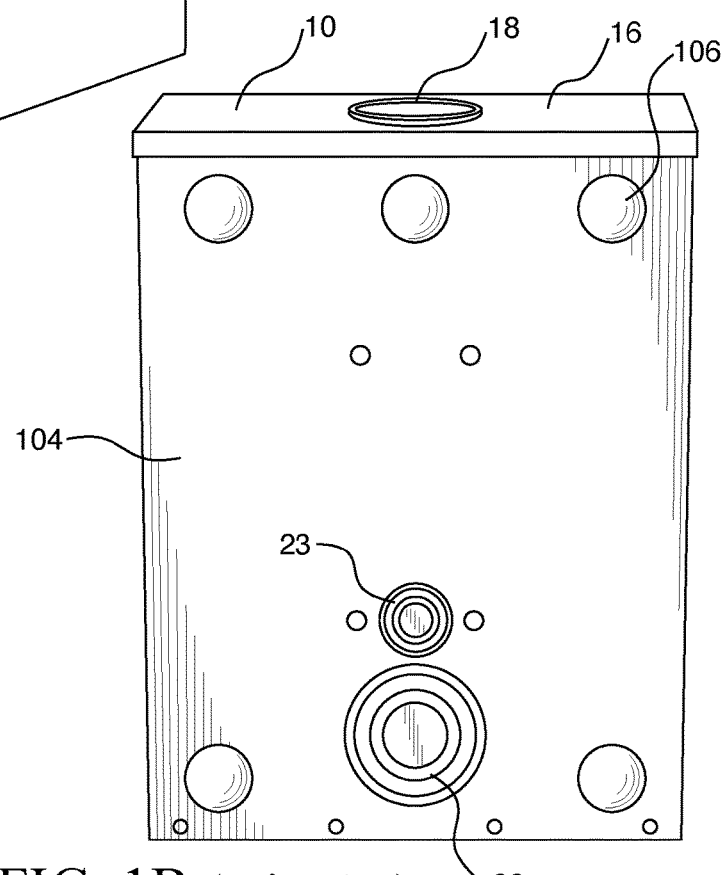

Certain terminology is used in the following description for convenience only and is not limiting. The words "lower," "bottom," "upper," "top," and the like designate directions in the drawings to which reference is made. The words "inwardly," "outwardly," "upwardly," "downwardly," and the like refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the invention comprise a low profile watertight connector to be used with an electric meter box and methods for using such a low profile watertight connector with an electric meter box. Specifically, the connector of embodiments of the invention helps prevent water from infiltrating into a meter box where the power line to a building enters the meter box. The low profile watertight connector of embodiments of the invention is especially useful when replacing a meter box, since the connector can provide a watertight connection for load side wires of various sizes and in various conditions. Advantageously, the low profile watertight connector of embodiments of the invention enables wiring/re-wiring of the meter box without having to enlarge the power line entry hole or otherwise damaging the siding.

Figure 2A:
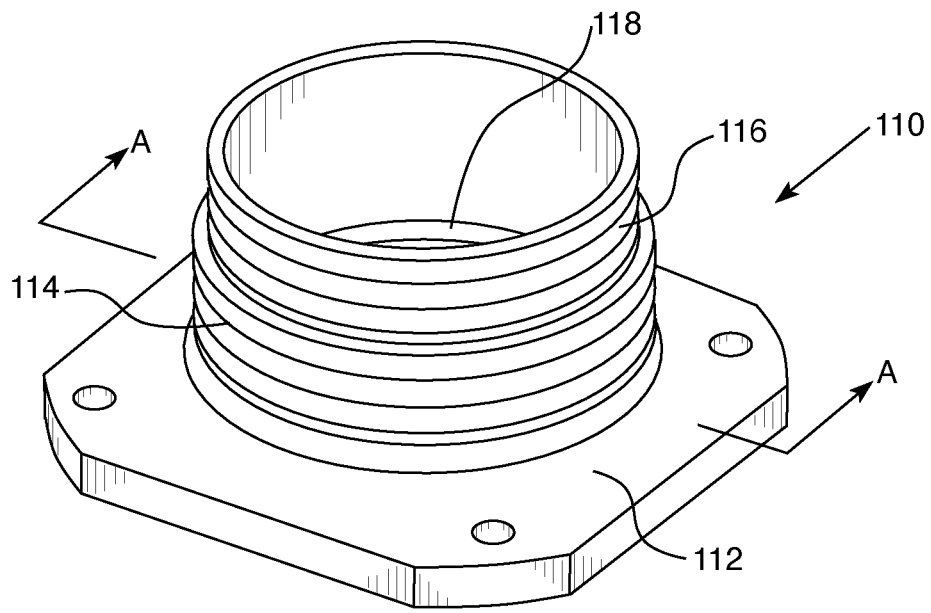
FIGS. 2A and 2B are, respectively, a perspective view and a sectional view of a flanged main connector body of a low profile watertight connector, in accordance with embodiments of the present invention.
Figure 2B:
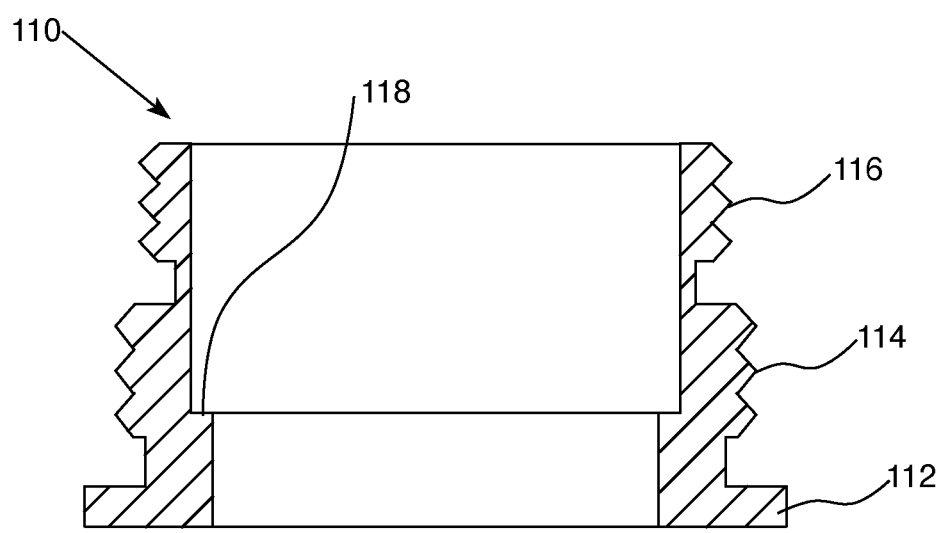
Figure 9:
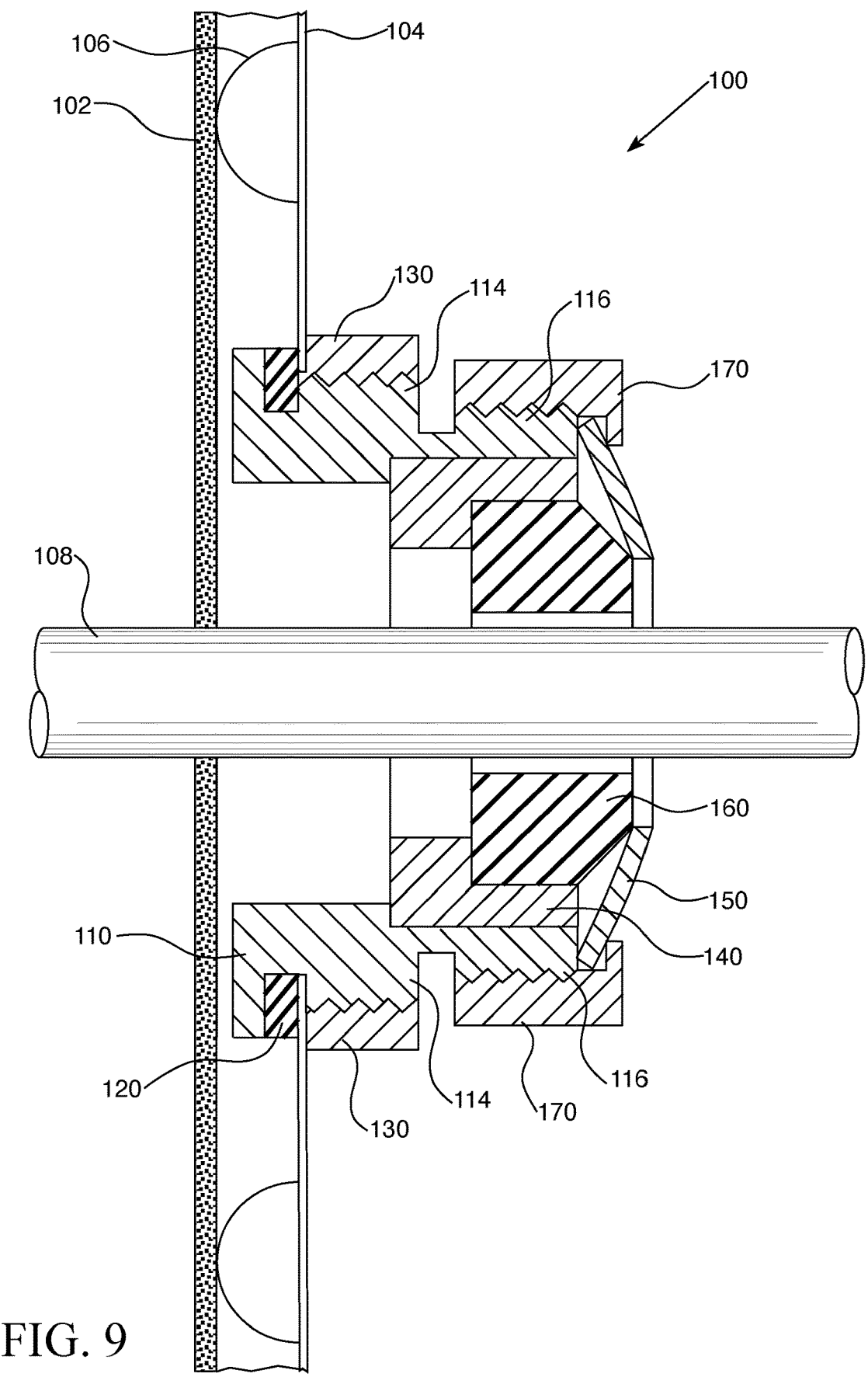
FIG. 9 is a sectional side view of a low profile watertight connector in use, in accordance with embodiments of the present invention.
Figure 10:
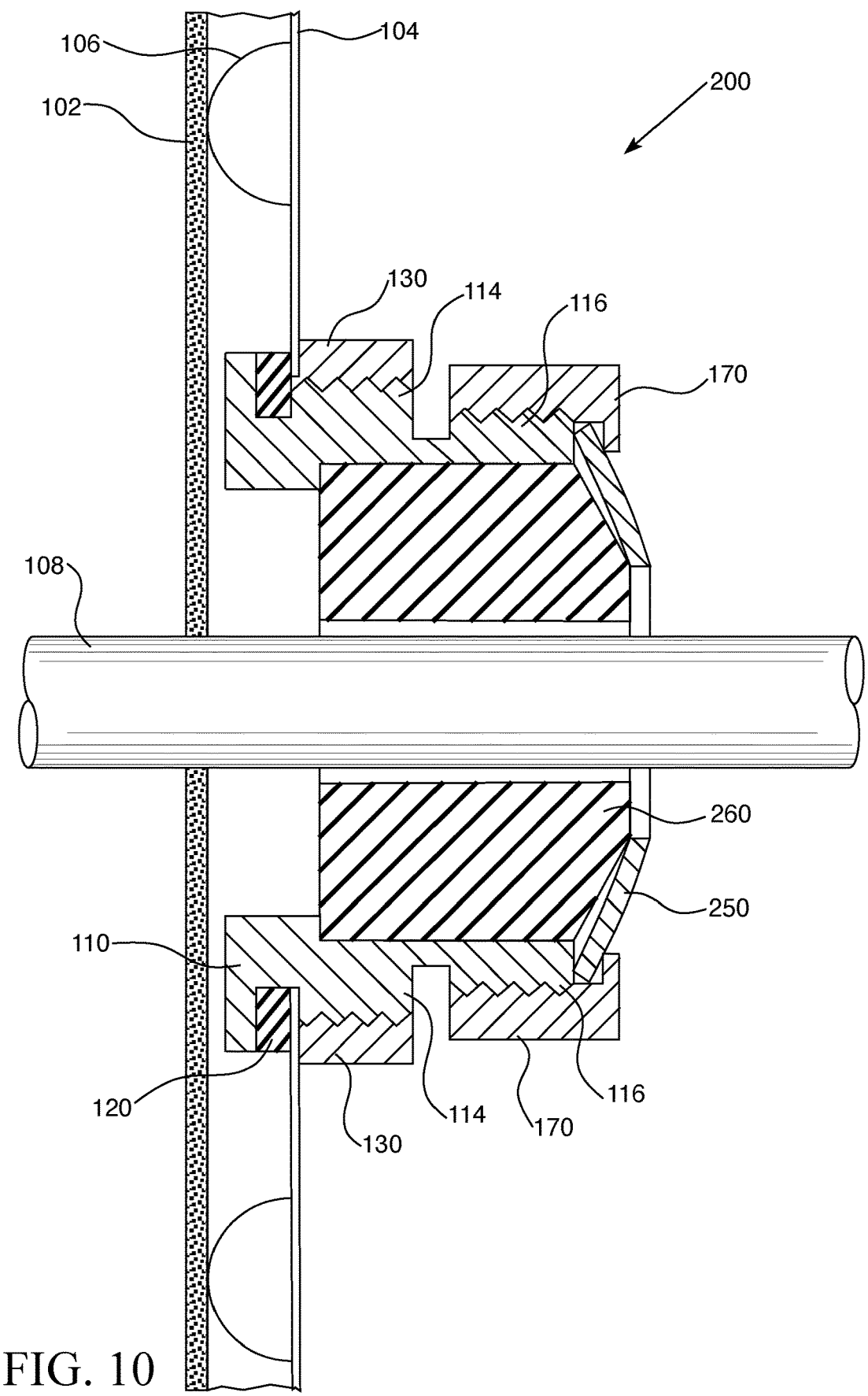
FIG. 10 is a sectional side view of a low profile watertight connector in use, in accordance with alternative embodiments of the present invention.

FIGS. 2A-7D illustrate the individual components of such a connector of embodiments of the invention are illustrated, and FIGS. 9 and 10 illustrate two different embodiments of the connector in use. FIGS. 2A and 2B are, respectively, a perspective view and a sectional view along line A-A of a flanged main connector body 110 of a low profile watertight connector, in accordance with embodiments of the present invention. The flanged main connector body 110 is generally cylindrical with a through-hole. The flanged main connector body 110 has a low profile mounting flange 112. The thickness of the mounting flange 112 is selected such that the mounting flange 112 fits in the space between the back wall 104 of the meter box 10 and the wall 102 (seen in FIGS. 9, 10) of the building to which the meter box 10 is mounted (the presence of such a space is due to the protrusions 106 on the back wall 104 of the meter box 10). Adjacent to the mounting flange 112 is a first male threaded portion 114, and adjacent to the first male threaded portion 114 is a second male threaded portion 116. The outer diameter (OD) of the first male threaded portion 114 is greater than the OD of the second male threaded portion 116. The inner diameter (ID) of the first male threaded portion 114 is less than the ID of the second male threaded portion 116. In this regard, a circumferential ledge 118 is formed on the inner wall of the flanged main connector body 110 at approximately where the first and second male threaded portions 114, 116 meet. Other than the ledge 118, the inner surface of the flanged main connector body 110 is typically smooth. The flanged main connector body 110 may be constructed of any suitable metal or plastic.

Figure 3:
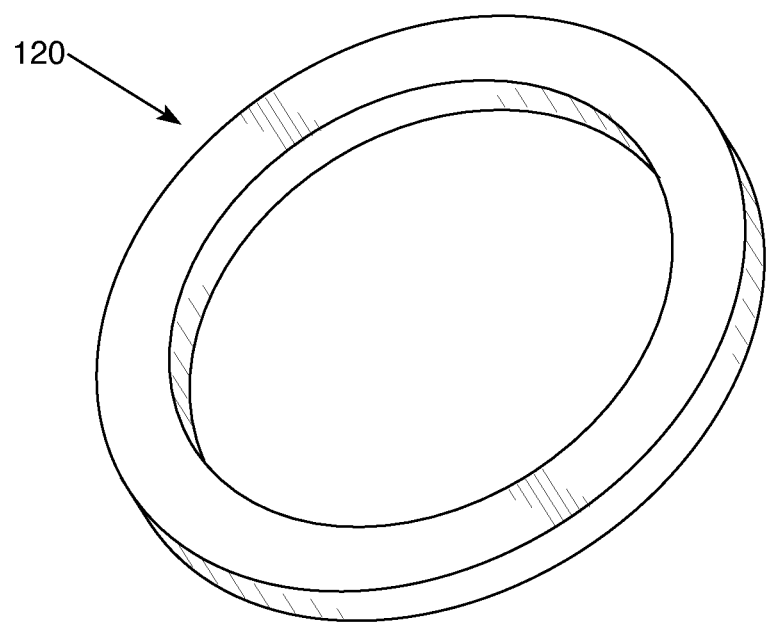
FIG. 3 is a perspective view of a gasket of a low profile watertight connector, in accordance with embodiments of the present invention.

FIG. 3 is a perspective view of a gasket 120 of a low profile watertight connector, in accordance with embodiments of the present invention. The gasket 120 is generally circular and flat. The gasket may be constructed of any suitable material, such as any suitable rubber material (natural and/or synthetic).

In use, the threaded portions 114, 116 of the flanged main connector body 110 are inserted through the gasket 120 until the gasket 120 rests against the mounting flange 112. The threaded portions 114, 116 of the flanged main connector body 110 are then inserted through a hole created in the back wall 104 of the meter box 10 (after the knockout 22 is removed) until the mounting flange 112 and the gasket 120 rest against the outside surface of the back wall 104 of the meter box 10.

FIGS. 4A and 4B are, respectively, a perspective view and a sectional view along line B-B of a connector nut 130 of a low profile watertight connector, in accordance with embodiments of the present invention. The connector nut 130 is female threaded and sized to thread onto the first male threaded portion 114 of the flanged main connector body 110. When the flanged main connector body 110 is inserted into the hole in the back wall 104 of the meter box 10, threading the connector nut 130 onto the first male threaded portion 114 secures the flanged main connector body 110 to the meter box 10. The square outer shape, the spaced round holes, and the spaced notches allow various different tool designs for tightening the connector nut 130 onto the first male threaded portion 114. In the illustrated embodiment, the connector nut 130 is left-hand threaded, which helps keep the connector nut from loosening when the grommet nut (described below) is threaded onto the flanged main connector body. The connector nut 130 may be constructed of any suitable metal or plastic.

FIGS. 5A and 5B are, respectively, a perspective view and a sectional view along line C-C of a grommet adapter 140 of a low profile watertight connector, in accordance with embodiments of the present invention. The grommet adapter 140 may or may not be needed, depending on the size of the grommet (see FIG. 6) used. FIG. 9 illustrates a low profile watertight connector that uses a grommet adapter, while FIG. 10 illustrates a low profile watertight connector that does not use a grommet adapter. The grommet adapter 140 is used when the grommet is too small to mate directly with the interior surface and ledge 118 of the first male threaded portion 114 of the flanged main connector body 110. The grommet adapter 140 is generally cylindrical with a through-hole. The grommet adapter 140 has a uniform OD. The inner wall of the grommet adapter 140 has two different inner diameters, such that a circumferential ledge 142 is formed on the inner wall of the grommet adapter 140. Other than the ledge 142, the inner surface of the grommet adapter 140 is typically smooth. The grommet adapter 140 may be constructed of any suitable metal or plastic.

When the grommet adapter 140 is used, the grommet adapter 140 is inserted into the first male threaded portion 114 of the flanged main connector body 110 until the grommet adapter 140 rests against the ledge 118 of the first male threaded portion 114.

Figure 6:
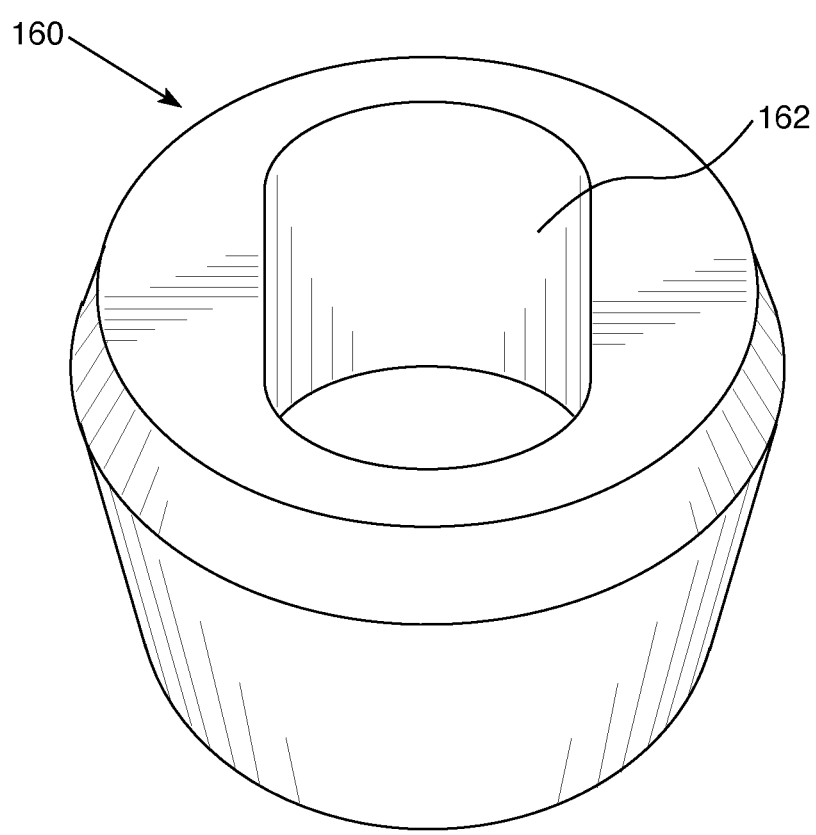
FIG. 6 is a perspective view of a grommet of a low profile watertight connector, in accordance with embodiments of the present invention.
Figure 7A:
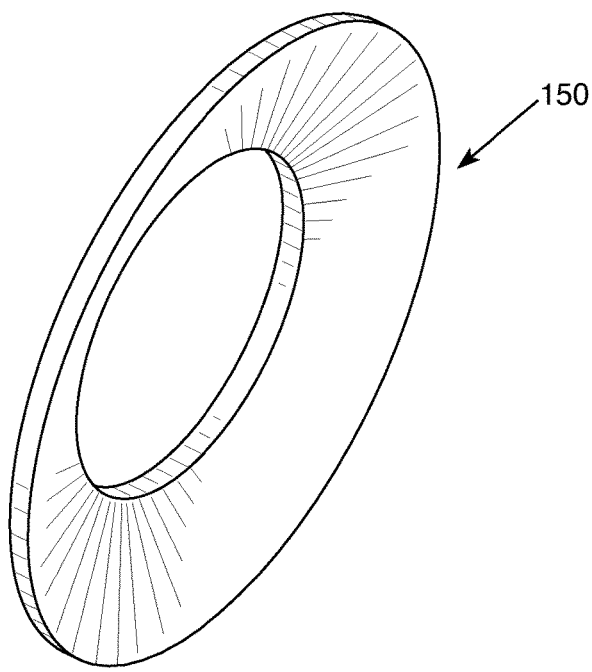
FIGS. 7A-D are, respectively, a perspective view, a top view, a side view, and a sectional view of a cup washer of a low profile watertight connector, in accordance with embodiments of the present invention.
Figure 7C:
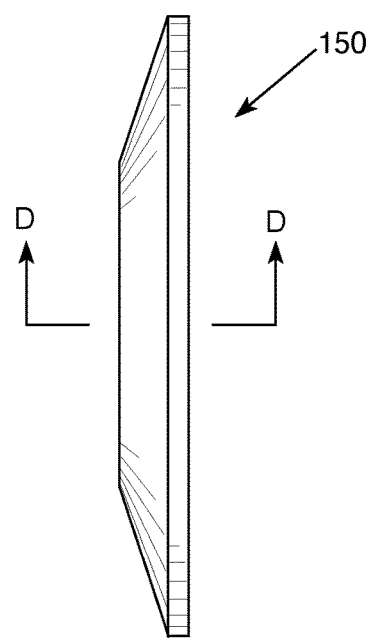
Figure 7B:
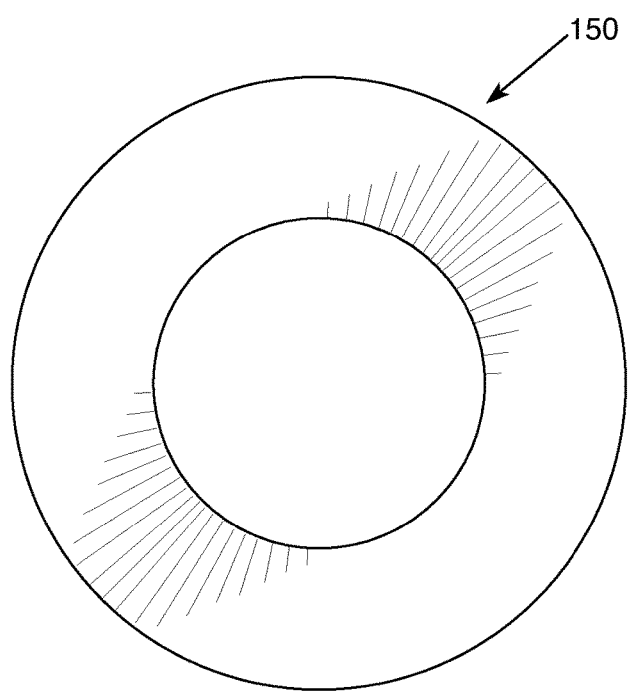
Figure 7D:
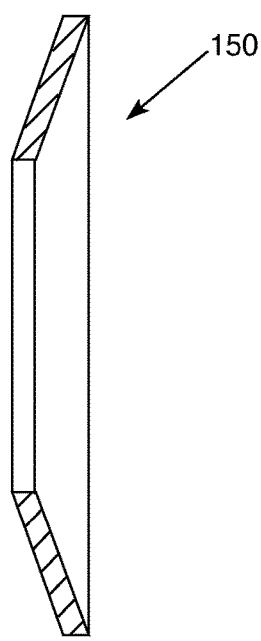

FIG. 6 is a perspective view of a grommet 160 of a low profile watertight connector, in accordance with embodiments of the present invention. The grommet 160 is generally cylindrical with an oblong through-hole 162. The size and shape of the through-hole may be selected based on the size and shape of the wire that will be inserted through the grommet 160, such that the wire fits snugly in the through-hole. One end of the grommet 160 is flat while the other end (the top end in FIG. 6) is chamfered. When the grommet adapter 140 is used, the grommet 160 is inserted into the grommet adapter 140 until the flat end of the grommet 160 rests against the ledge 142 of the grommet adapter 140. When the grommet adapter 140 is not used, the grommet 160 is inserted into the first male threaded portion 114 of the flanged main connector body 110 until the grommet 160 rests against the ledge 118 of the first male threaded portion 114. The grommet 160 may be constructed of any suitable material, such as any suitable rubber material (natural and/or synthetic).

FIGS. 7A-D are, respectively, a perspective view, a top view, a side view, and a sectional view along line D-D of a cup washer 150 of a low profile watertight connector, in accordance with embodiments of the present invention. The cup washer 150 is generally circular but with an angled or cupped profile. In use, the cup washer 150 is placed on top of the grommet 160 to help hold the grommet 160 in place. The size of the cup washer 150 may vary depending on the size of the grommet 160. The cup washer 150 may be constructed of any suitable metal or plastic. In addition to helping to provide the watertight nature of the connector, the grommet insulates the load side wire from the metal wall of the meter box.

Figure 8A:
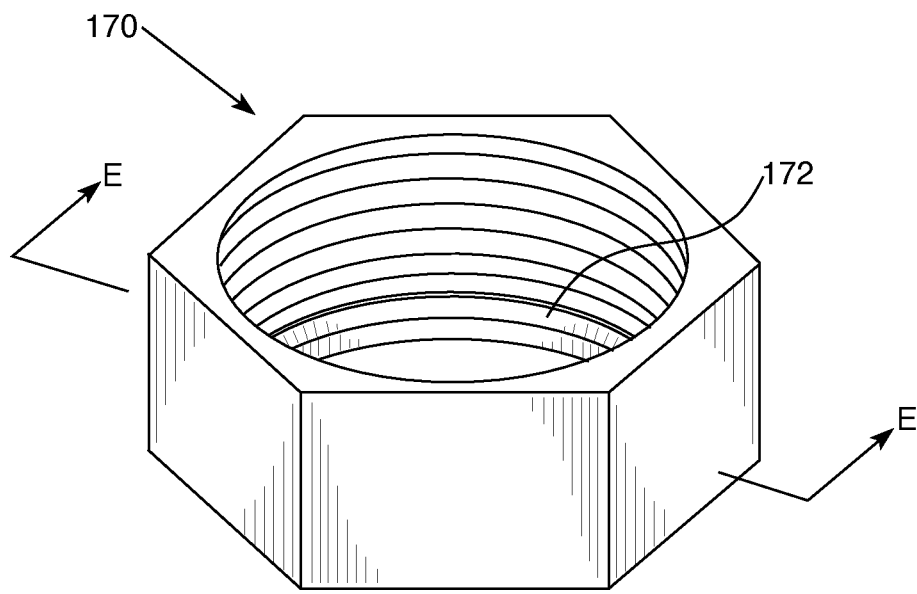
FIGS. 8A and 8B are, respectively, a perspective view and a sectional view of a grommet nut of a low profile watertight connector, in accordance with embodiments of the present invention.
Figure 8B:
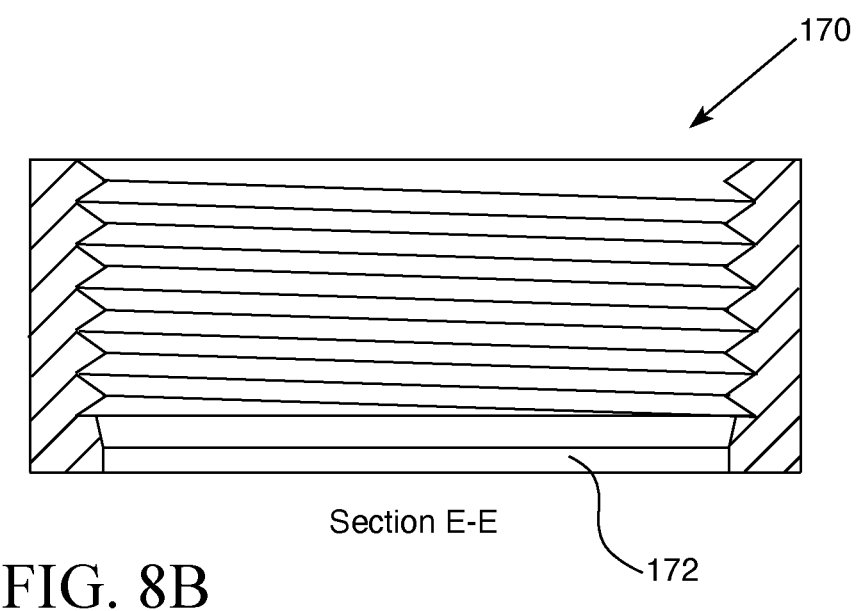

FIGS. 8A and 8B are, respectively, a perspective view and a sectional view along line E-E of a grommet nut 170 of a low profile watertight connector, in accordance with embodiments of the present invention. The outer surface of the grommet nut 170 is hexagonal and the inner surface is female threaded with an inwardly-projecting circumferential lip 172 on one end. In use, the grommet nut 170 is threaded onto the second male threaded portion 116 of the flanged main connector body 110. When the grommet nut 170 is threaded onto the second male threaded portion 116, the lip 172 of the grommet nut 170 contacts and holds the cupped washer 150 in place which in turn holds the grommet 160 in place. The grommet nut 170 may be constructed of any suitable metal or plastic.

FIG. 9 is a sectional side view of a low profile watertight connector 100 in use, in accordance with embodiments of the present invention. In the embodiment of FIG. 9, a smaller grommet 160 is used such that the grommet adapter 140 is needed. The threaded portions 114, 116 of the flanged main connector body 110 are inserted through the gasket 120 until the gasket 120 rests against the mounting flange 112. The threaded portions 114, 116 of the flanged main connector body 110 are then inserted through a hole created in the back wall 104 of the meter box 10 when the knockout 22 is removed until the mounting flange 112 and the gasket 120 rest against the outside surface of the back wall 104 of the meter box 10. The connector nut 130 is threaded onto the first male threaded portion 114 of the flanged main connector body 110 to secure the flanged main connector body 110 to the meter box 10. The grommet adapter 140 is inserted into the first male threaded portion 114 of the flanged main connector body 110 until the grommet adapter 140 rests against the ledge 118 of the first male threaded portion 114. The grommet 160 is inserted into the grommet adapter 140 until the flat end of the grommet 160 rests against the ledge 142 of the grommet adapter 140. The cup washer 150 is placed on top of the grommet 160. The grommet nut 170 is threaded onto the second male threaded portion 116 of the flanged main connector body 110 such that the lip 172 of the grommet nut 170 contacts and holds the cupped washer 150 in place which in turn holds the grommet 160 in place. An electric power line 108 protruding through a wall 102 of a building is inserted through the watertight connector and into the interior of the meter box as shown in FIG. 9.

FIG. 10 is a sectional side view of a low profile watertight connector 200 in use, in accordance with alternative embodiments of the present invention. The process of installing the low profile watertight connector of FIG. 10 is that same as that of FIG. 9, except in FIG. 10 the grommet 260 is larger, resulting in a different size cupped washer 250 and the omission of a grommet adapter.

Figure 11A:
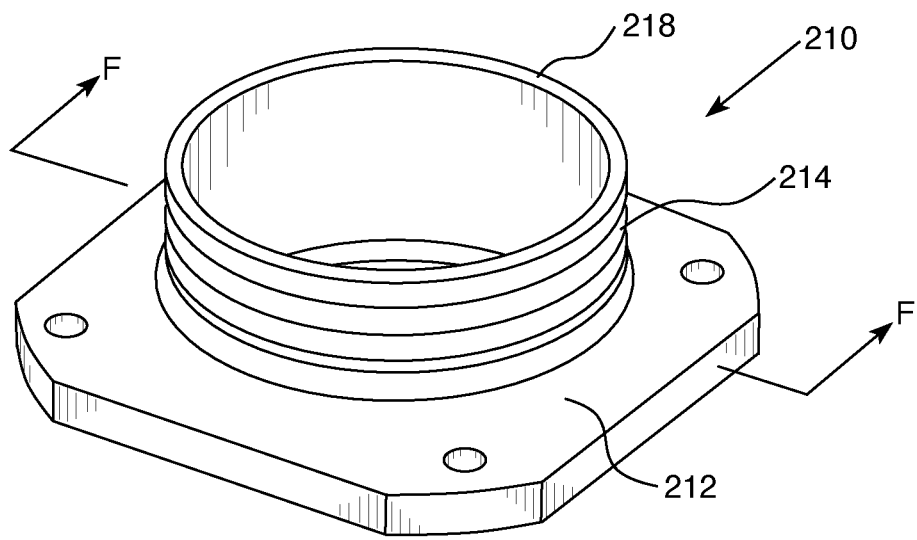
FIGS. 11A and 11B are, respectively, a perspective view and a sectional view of a flanged main connector body of a low profile watertight connector, in accordance with alternative embodiments of the present invention.
Figure 11B:
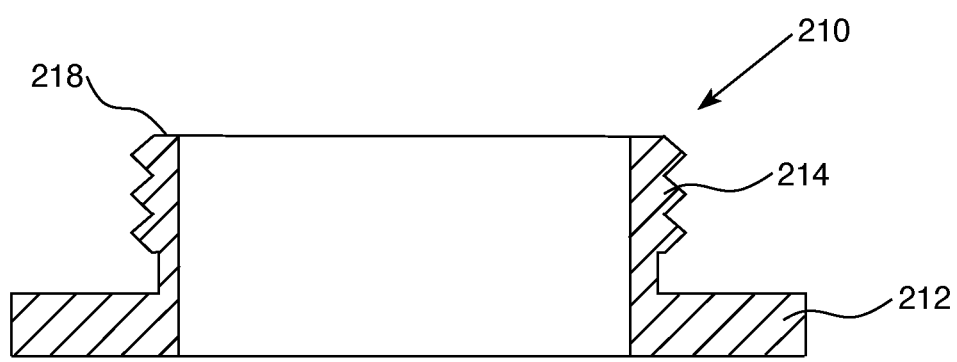
Figure 12A:
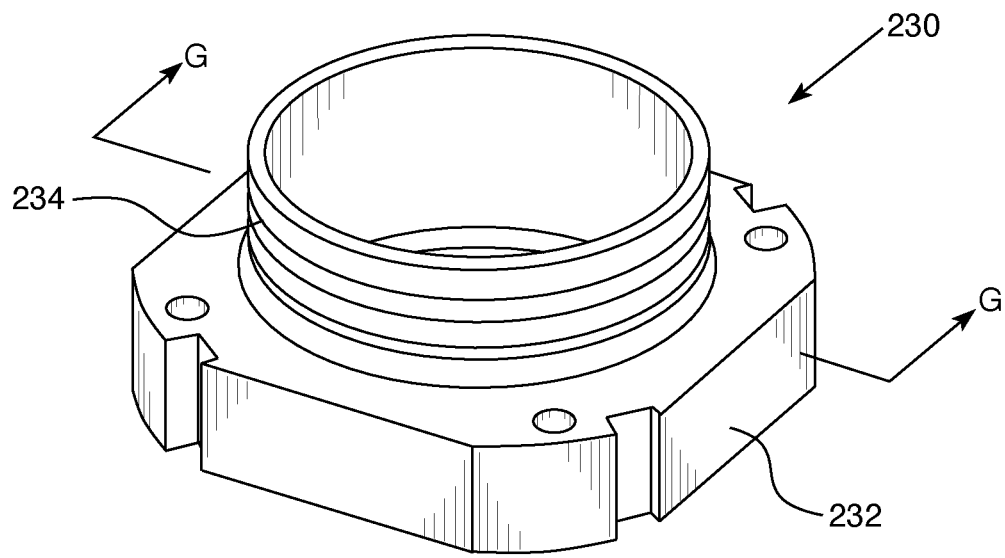
FIGS. 12A and 12B are, respectively, a perspective view and a sectional view of a connector nut of a low profile watertight connector, in accordance with alternative embodiments of the present invention.
Figure 12B:
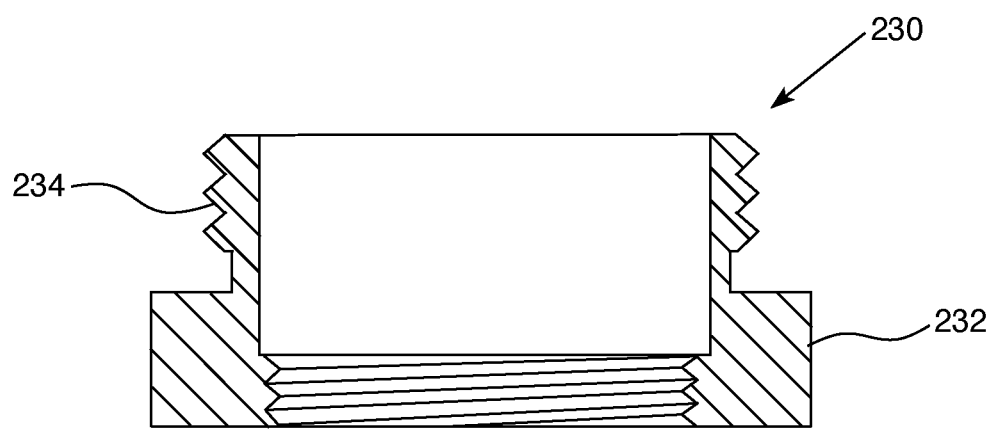

In alternative embodiments of the invention, the flanged main connector body and the connector nut have a different structure. FIGS. 11A and 11B are, respectively, a perspective view and a sectional view of a flanged main connector body 210 of a low profile watertight connector and FIGS. 12A and 12B are, respectively, a perspective view and a sectional view of a connector nut 230 of a low profile watertight connector, in accordance with alternative embodiments of the present invention. The flanged main connector body 210 is generally cylindrical with a through-hole. The flanged main connector body 210 has a low profile mounting flange 212. The thickness of the mounting flange 212 is selected such that the mounting flange 212 fits in the space between the back wall 104 of the meter box 10 and the wall of the building to which the meter box 10 is mounted. Adjacent to the mounting flange 212 is a male threaded portion 214 with a top edge 218. Unlike the flanged main connector body 110 of FIGS. 2A and 2B, the flanged main connector body 210 of FIGS. 11A and 11B has only one male threaded portion. In the illustrated embodiment of FIGS. 11A and 11B, the male threaded portion 214 has a smaller outer diameter than the first male threaded portion 114 of FIGS. 2A and 2B. As such, while a gasket (similar to the gasket 120 of FIG. 3) will be placed over the male threaded portion 214 prior to insertion into the hole in the back wall 104 of the meter box 10, the gasket used with the male threaded portion 214 of FIGS. 11A and 11B will have a smaller inner diameter than the gasket 120 of FIG. 3 (but likely the same outer diameter). The inner surface of the flanged main connector body 210 is typically smooth. The flanged main connector body 210 may be constructed of any suitable metal or plastic.

The connector nut 230 of FIGS. 12A and 12B has a flanged portion 232 that is female threaded and sized to thread onto the male threaded portion 214 of the flanged main connector body 210. When the flanged main connector body 210 is inserted into the hole in the back wall 104 of the meter box 10, threading the flanged portion 232 of the connector nut 230 onto the male threaded portion 214 secures the flanged main connector body 210 to the meter box 10. The square outer shape, the spaced round holes, and the spaced notches of the flanged portion 232 allow various different tool designs for tightening the connector nut 230 onto the male threaded portion 214. A variety of tools, such as spanners, channel locks, sockets, and screwdrivers may be used to tighten the connector nut and assembly. In the illustrated embodiment, the female threaded portion of the connector nut 230 is right-hand threaded. The connector nut 230 further has a male threaded portion 234 adjacent the flanged portion 232. The grommet nut 170 is threaded onto the male threaded portion 234 of the connector nut 230 to hold the cupped washer 150 in place which in turn holds the grommet 160 in place. In this regard, the flanged main connector body 210 and the connector nut 230 of FIGS. 11A, 11B, 12A, and 12B together provide the same functionality as the flanged main connector body 110 and the connector nut 130 of FIGS. 2A, 2B, 4A, and 4B. The grommet adapter 140 (if needed) or the grommet 160 rest against the top edge 218 of the male threaded portion 214 of the flanged main connector body 210 (i.e., the top edge 218 provides the same functionality as the ledge 118 of the flanged main connector body 110). Other than that, the grommet adapter 140 (if needed), the grommet 160, and the grommet nut 170 interface with the flanged main connector body 210 and the connector nut 230 of FIGS. 11A, 11B, 12A, and 12B in the same way as with the flanged main connector body 110 and the connector nut 130 of FIGS. 2A, 2B, 4A and 4B. The connector nut 230 may be constructed of any suitable metal or plastic.

Figure 13A:
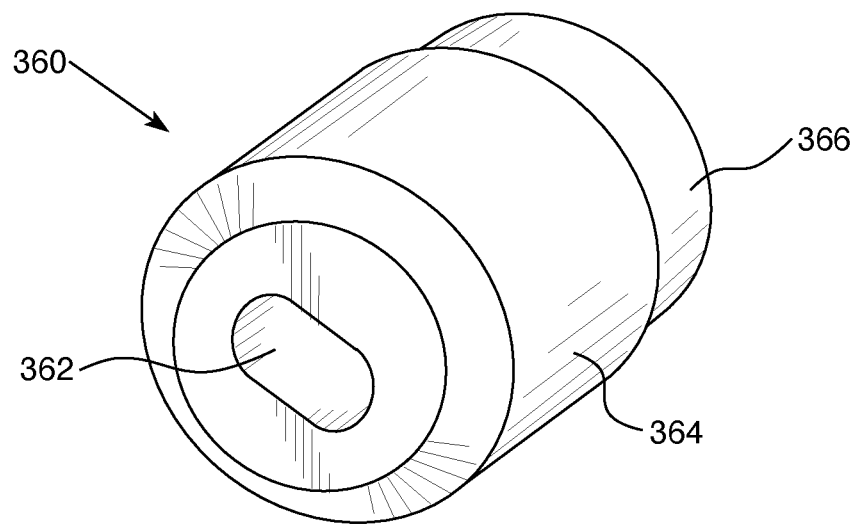
FIGS. 13A-C are, respectively, a perspective view, a side view, and a bottom view of a grommet of a low profile watertight connector, in accordance with alternative embodiments of the present invention.
Figure 13C:
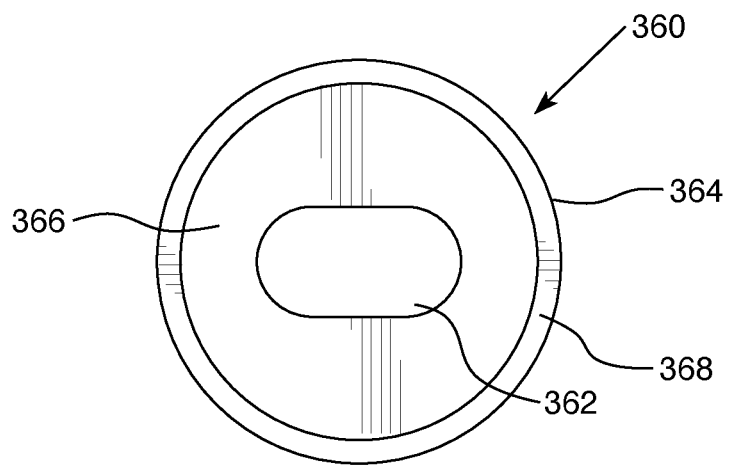
Figure 13B:
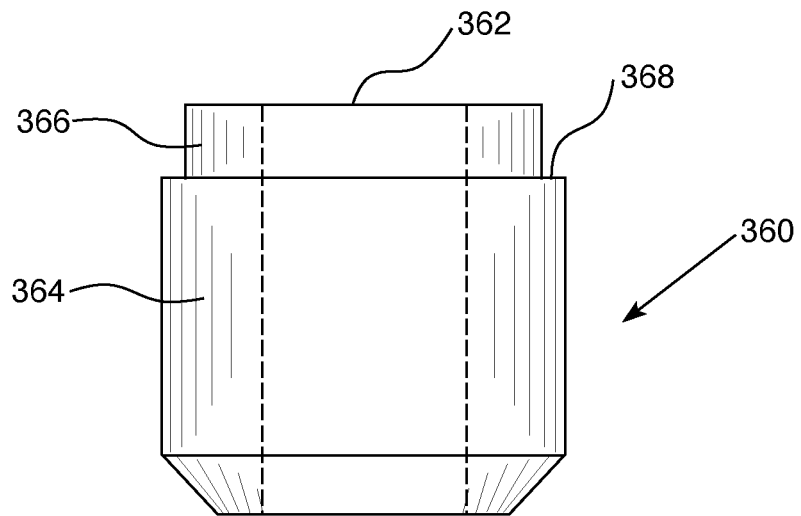

FIGS. 13A-C are, respectively, a perspective view, a side view, and a bottom view of a grommet of a low profile watertight connector, in accordance with alternative embodiments of the present invention. The grommet 360 is similar to the grommet 160 in that the grommet 360 has first section 364 that fits relatively snugly within the second male threaded portion 116 of the flanged main connector body 110. Unlike the grommet 160, the grommet 360 also has a smaller diameter second portion 366 that fits relatively snugly within the first male threaded portion 114 of the flanged main connector body 110. The smaller diameter of the second portion 366 forms a shoulder 368. The shoulder 368 engages with the circumferential ledge 118 of the flanged main connector body 110. Through-hole 362 extends through both the first section 364 and the second section 366 of the grommet 360.

Figure 14:
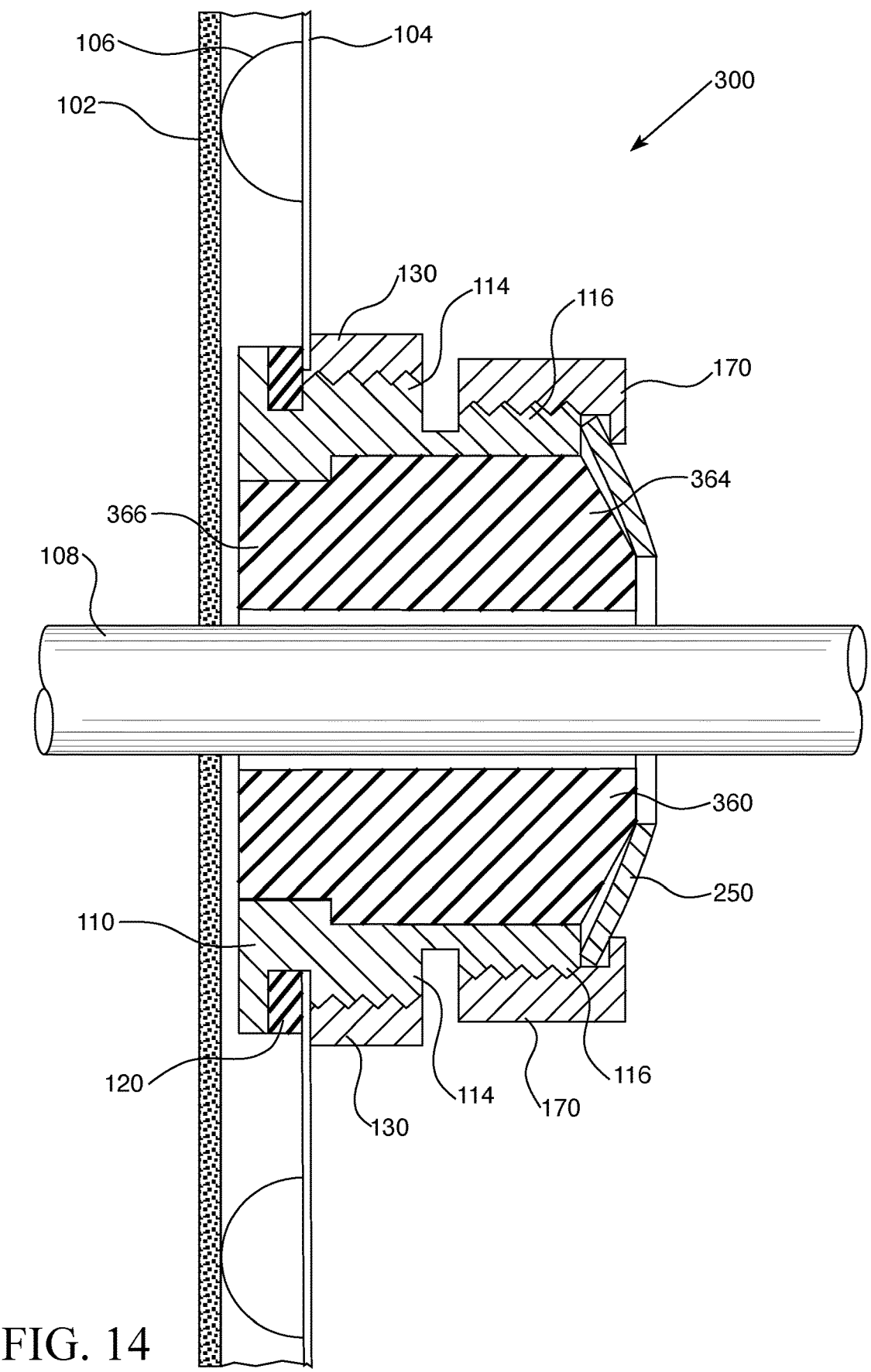
FIG. 14 is a sectional side view of a low profile watertight connector in use, in accordance with alternative embodiments of the present invention.

FIG. 14 is a sectional side view of a low profile watertight connector 300 in use, in accordance with alternative embodiments of the present invention. The process of installing the low profile watertight connector of FIG. 14 is that same as that of FIG. 10, except in FIG. 14 the grommet 360 is used.

In all of the illustrated embodiments, the grommet is squeezed between a cupped washer and a ledge (either ledge 142 of the grommet adapter 140, ledge 118 of the flanged main connector body 110, or the top edge 218 of the flanged main connector body 210) to retain the grommet in position and to partially compress the grommet around the power line 108 which helps secure the power line 108 in place. It is desirable that the grommet be squeezed only between portions of the connector itself (e.g., the cupped washer or the like and a ledge-like structure), rather than pushing the grommet against the wall 102 which might cause undesirable deflection in either the wall 102 of the structure or the back wall 104 of the meter box 10.

As seen in FIGS. 9, 10, and 14, the low profile nature of the connector 100, 200, 300 (respectively) of embodiments of the invention results in the connector 100, 200, 300 not protruding from the back of the meter box as far as the protrusions 106 on the back wall 104 of the meter box 10, thereby ensuring that (in nearly all circumstances) the power line 108 can be wired/re-wired to the meter box 10 without having to damage the siding by enlarging the hole through which the power line enters the building.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A connector adapted to secure an electrical power line entering an electrical meter box, the connector comprising:
   a cylindrical member having a longitudinal through-hole, a first male threaded portion, and a second male threaded portion, the cylindrical member adapted to be at least partially inserted into the meter box through an access hole defined in a wall of the meter box;
   a flange affixed to or integral with a first end of the cylindrical member, the flange having a through-hole aligned with the through-hole of the cylindrical member, the flange adapted to remain outside of the meter box when the cylindrical member is at least partially inserted into the meter box, the flange adapted to abut an outer surface of the wall of the meter box or to abut a gasket sandwiched between the flange and the outer surface of the wall of the meter box;
   a connector nut that is left-handed threaded and threaded onto the first male threaded portion;
   a grommet nut having an inner surface that is female threaded and an inwardly protecting circumferential lip;
   a cupped washer, wherein the circumferential lip holds the cupped washer in place and the cupped washer in turn holds the grommet in place; and
   a cylindrical grommet having a longitudinal through-hole, the grommet selectively insertable at least partially into a second end of the cylindrical member and securable therein;
   wherein the flange through-hole, the cylindrical member through-hole, and the grommet through-hole are all adapted for the power line to pass as the power line enters the meter box.

2. The connector of claim 1, wherein the cylindrical member comprises a support ledge on an internal surface of the cylindrical member.

3. The connector of claim 2, wherein the ledge comprises a circumferential ledge.

4. The connector of claim 2, wherein a portion of the grommet contacts the ledge when the grommet is inserted at least partially into a second end of the cylindrical member.

5. The connector of claim 4, wherein the grommet comprises a first cylindrical portion having a diameter and a second cylindrical portion having a diameter greater than the diameter of the first cylindrical portion, thereby forming a shoulder where the first cylindrical portion and the second cylindrical portion meet; and
   wherein the shoulder contacts the ledge when the grommet is inserted at least partially into a second end of the cylindrical member.

6. The connector of claim 4, further comprising a securing means to secure the grommet at least partially in the cylindrical member.

7. The connector of claim 6, wherein the securing means also compresses the grommet against the ledge.

8. The connector of claim 6, wherein the securing means comprises a cupped washer selectively positionable against an end of the grommet furthest from the flange and a nut selectively attachable to the second end of the cylindrical member to retain the cupped washer against the grommet; and
   wherein the cupped washer defines a center hole that aligns with the grommet through-hole when the cupped washer is positioned against the grommet.

9. The connector of claim 2, further comprising a cylindrical grommet adapter having a first inner diameter and a second inner diameter greater than the first inner diameter, thereby forming a ledge;
   wherein the grommet adapter is selectively insertable at least partially into the cylindrical member; and
   wherein a portion of the grommet contacts the ledge of the grommet adapter when the grommet is selectively inserted at least partially into the cylindrical member.

10. A method of securing an electrical power line entering an electrical meter box, the method comprising:
    obtaining a connector comprising (a) a first cylindrical member having a longitudinal through-hole and a flange affixed to or integral with a first end of the first cylindrical member, the flange having a through-hole aligned with the through-hole of the first cylindrical member; (b) a second cylindrical member selectively attachable to a second end of the first cylindrical member and having a longitudinal through-hole aligned with the through-hole of the first cylindrical member and the through-hole of the flange; and (c) a cylindrical grommet having a longitudinal through-hole, the grommet selectively insertable at least partially into the second cylindrical member and securable therein;
    inserting the second end of the first cylindrical member through an access hole defined in a wall of the meter box until the flange or a gasket encircling the first cylindrical member adjacent the flange abuts the outer surface of the wall of the meter box, such that the flange remains outside the meter box;
    attaching the second cylindrical member to the first cylindrical member;
    inserting the grommet at least partially into the second cylindrical member; and
    inserting a power line into the meter box through the flange through-hole, through the first cylindrical member through-hole, through the second cylindrical member through-hole, and through the grommet through-hole.

11. The method of claim 10, wherein the second cylindrical member is selectively attachable to the first cylindrical member via male threads on the first cylindrical member and cooperating female threads on the second cylindrical member.

12. The method of claim 11, wherein the second cylindrical member is adapted to draw the flange or the gasket against the outer surface of the wall of the meter box as the second cylindrical member is selectively attached to the first cylindrical member, thereby securing the connector to the wall of the meter box.

13. The method of claim 10, wherein a portion of the grommet contacts the second end of the first cylindrical member when the grommet is inserted at least partially into the second cylindrical member.

14. The method of claim 13, wherein the grommet comprises a first cylindrical portion having a diameter and a second cylindrical portion having a diameter greater than the diameter of the first cylindrical portion, thereby forming a shoulder where the first cylindrical portion and the second cylindrical portion meet; and
    wherein the shoulder contacts the second end of the first cylindrical member when the grommet is inserted at least partially into the second cylindrical member.

15. The method of claim 13, wherein the connector further comprises a securing means to secure the grommet at least partially in the second cylindrical member; and wherein the method further comprises securing the grommet at least partially in the second cylindrical member using the securing means.

16. The method of claim 15, wherein the securing means also compresses the grommet against the second end of the first cylindrical member.

17. The method of claim 15, wherein the securing means comprises a cupped washer selectively positionable against an end of the grommet furthest from the flange and a nut selectively attachable to the second cylindrical member to retain the cupped washer against the grommet;
   wherein the cupped washer defines a center hole that aligns with the grommet through-hole when the cupped washer is positioned against the grommet; and
   wherein securing the grommet at least partially in the second cylindrical member comprises positioning the cupped washer against the end of the grommet furthest from the flange and attaching the nut to the second cylindrical member.

* * * * *